United States Patent [19]

Yasuoka et al.

[11] 4,221,360
[45] Sep. 9, 1980

[54] BUTTERFLY VALVE

[75] Inventors: Masahiro Yasuoka, Sakai; Yoshitsugu Okada, Hirakata, both of Japan

[73] Assignee: Kubota, Ltd., Osaka, Japan

[21] Appl. No.: 971,146

[22] Filed: Dec. 19, 1978

[30] Foreign Application Priority Data

Jan. 27, 1978 [JP] Japan .............................. 53-8460

[51] Int. Cl.³ .............................................. F16K 1/226
[52] U.S. Cl. ..................................... 251/305; 251/306
[58] Field of Search ................................. 251/305, 306

[56] References Cited

U.S. PATENT DOCUMENTS

| | | | |
|---|---|---|---|
| 2,011,641 | 8/1935 | Kruse | 251/305 |
| 3,442,488 | 5/1969 | Adams | 251/305 |
| 3,475,007 | 10/1969 | Fawkes | 251/305 |
| 3,578,287 | 5/1971 | Salerno et al. | 251/306 |
| 3,931,955 | 1/1976 | Jacobs | 251/305 |
| 3,963,213 | 6/1976 | Brattberg | 251/306 |
| 4,003,394 | 1/1977 | Adams | 251/306 |
| 4,037,819 | 7/1977 | Kindersley | 251/305 |
| 4,058,290 | 11/1977 | Nelimarkka | 251/306 |
| 4,140,147 | 2/1979 | Van't Sant | 251/306 |

Primary Examiner—William R. Cline
Assistant Examiner—H. Jay Spiegel
Attorney, Agent, or Firm—Edwin E. Greigg

[57] ABSTRACT

A butterfly valve comprising a valve body provided with a hard body seat having a cylindrical sealing surface, and a valve disc rotatable within the body and provided with a hard disc seat on the periphery thereof. The body seat and the disc seat are adapted to contact each other substantially over the entire circumference. The valve of this invention is capable of good sealing and is opened with a small driving force.

1 Claim, 14 Drawing Figures

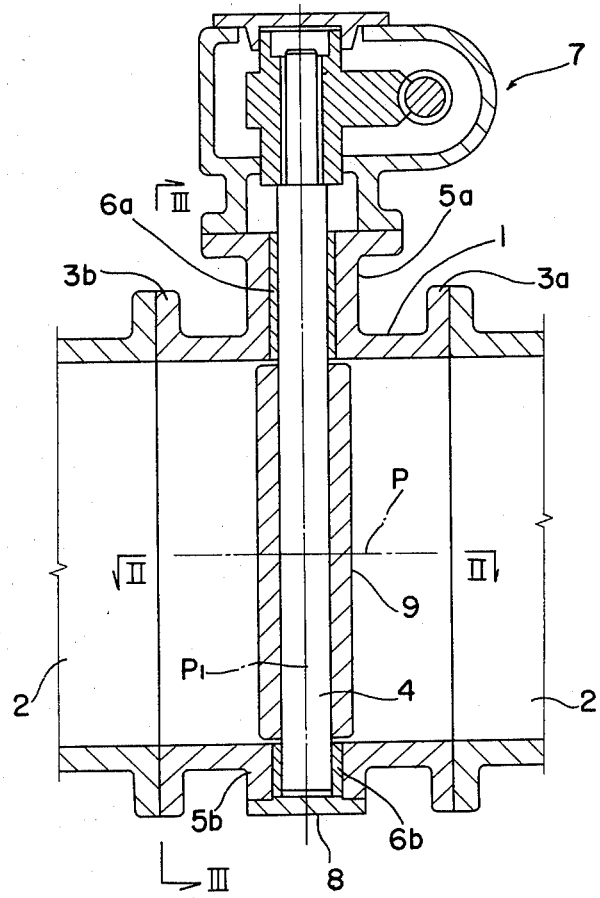
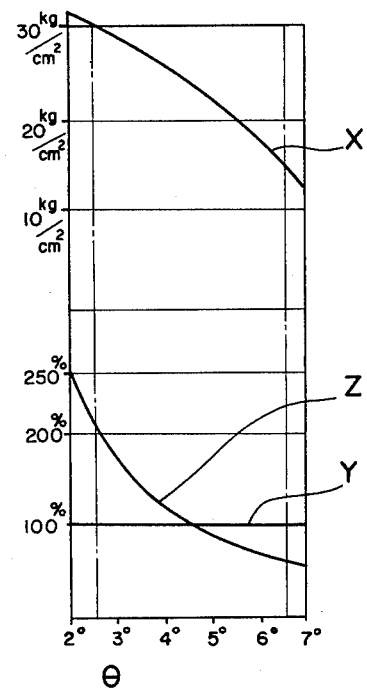
Fig. 1
Fig. 4

BUTTERFLY VALVE

BACKGROUND OF THE INVENTION

1. Field of the Invention

This invention relates to a butterfly valve comprising a valve body having a fluid passage, and a valve disc rotatable about an axis perpendicular or about perpendicular to a center line of the fluid passage, wherein a hard annular disc seat defined on the periphery of the valve disc is adapted to contact a hard annular body seat provided in the valve body over the entire circumference thereof when the valve disc is in a position perpendicular or about perpendicular to the center line of the fluid passage, and the body seat has a sealing surface corresponding to the peripheral surface of an imaginary cylinder having an axis inclined at an angle to the center line of the fluid passage in the direction of rotation to a closed position of the valve disc.

2. Description of the Prior Art

This type of valve has both the body seat in the valve body and the disc seat defined on the valve disc made of hard material that is free from change in quality over a long period of time, corrosion-resistant, mechanically strong, and invulnerable to wearing action of sand and the like contained in fluids, hence the body seat and the disc seat have long life. Since the valve disc assumes a position normal to the center line of the fluid passage to close it, the valve disc has the shape of a disc, which means an advantage of easiness in manufacture and shaping.

Furthermore, the cylindrical surface of the body seat which contacts the disc seat has the advantage that it is easy to finish such sealing surface of the body seat with high precision by means of machine tools in wide use.

In checking fluid leak through the body seat and the disc seat placed in contact with each other in an inclined manner, an internal fluid pressure, that occurs as the valve is closed, acts to expand the valve body, and this is followed by a rotation of the valve disc twisting the valve stem under the fluid pressure. This provides a mutual relation between the body seat and the valve disc wherein the former securely surrounds the latter over the entire circumference, and an excellent sealing condition is attained as a result.

The following observation is made of the interrelation between the angle of inclination and a further rotation to a very slight extent of the valve disc after closing. Where the angle is large, the ratio of a tangential force, namely a torque, acting on the contacting surfaces to a vertical force, namely a surface pressure, tends to be large, and the closing strength by the further rotation of the valve disc cannot surpass the friction between the sealing surfaces. Therefore, fluid leak occurs even under a relatively low internal pressure. In order to provide a good sealing condition, a certain degree of design surface pressure is essential to eliminate minute clearances between the two surfaces as much as possible. Conversely, where the angle is small, the valve disc makes the further rotation easily to provide a good sealing condition even under a high pressure. However, in the event that such further rotation is somewhat excessive, a different problem arises.

That is, the internal fluid pressure acts on one side of the valve disc when it is closed and the valve is opened after the pressure has been removed when occasion demands. If in such a case the further rotation of the valve disc is excessove at the time of applying or reducing pressure, the valve body contracts upon removal of the pressure while the valve disc remains in a closed position further advanced from the initial closed position, such that a large diameter portion of the valve disc is pressed into the body seat having a smaller diameter. This requires a greater driving force for opening the valve than for closing it, and sometimes it is impossible to open the valve without applying such a great torque as would damage the surfaces of the body seat and the disc seat.

In case the angle of inclination is smaller still, the valve disc could move beyond the dead point for full closure and then it could be opened only by expanding the valve body with the valve disc.

SUMMARY OF THE INVENTION

The foregoing facts have been contemplated and tests conducted by way of confirmation, and it is now found that the angle of inclination must be within a certain range in order to allow the valve to open without damaging the body seat or the disc seat and with a driving force not much greater than the force for closing the valve, even if pressure is applied or reduced when the valve is in the closed position, while effectively preventing fluid leakage.

This invention aims at opening and closing of the valve disc with a small driving force and maintenance of a good sealing condition when the valve is closed. The butterfly valve according to the invention is characterised in that the imaginary cylinder has the axis at the angle of 2 degrees 30 minutes to 6 degrees 30 minutes to the center line of the fluid passage.

A study has been made of the interrelation between a fluid leak starting pressure (X) when a fluid pressure is applied on one side of the valve disc in the closed position and a torque (Z) required for opening the valve when the fluid pressure has been removed based on a valve closing torque (Y), by setting the angle of inclination ($\theta$) at various degrees from 2 to 7 degrees. As shown in FIG. 4, the smaller the angle, the higher becomes the fluid leak starting pressure but the greater becomes the torque for opening the valve, whereas the larger the angle, the smaller is the torque needed for opening the valve but the lower becomes the fluid leak starting pressure. On the basis of these test results, the angle of inclination has been determined to be 2 degrees 30 minutes to 6 degrees 30 minutes, whereby a good sealing condition is secured when the valve is closed and at the same time the driving force for operation of the valve minimized.

A test result in the above connection is shown in FIGS. 5A to 5E in which the angle of inclination is set at 7 degrees and another test result is shown in FIGS. 6A to 6E in which the angle of inclination is set at 2 degrees, both using a butterfly valve of 2,400 mm inside diameter provided with a body seat and a disc seat of 20 kg/cm$^2$ design pressure.

FIGS. 5A and 6A show a first step of these tests at which a valve disc 9 is in an open position and is ready to be closed. FIGS. 5B and 6B show a second step at which valve disc 9 is in a closed position. In this condition body seat b of the valve body is slightly expanded by a closing force of the valve disc 9 acting thereon.

FIGS. 5C and 6C show a third step at which a fluid under zero pressure fills the space on one side of valve disc 9. The body seat b then expands further and valve disc 9 is displaced and rotated at the same time owing to torsional strain of the valve stem 4, whereby disc seat a of the valve disc 9 comes into contact with body seat b.

FIGS. 5D and 6D show a fourth step at which a 20 kg/cm² test pressure is applied on the one side of valve disc 9. In this state, body seat b expands still further and valve disc 9 is displaced and rotated at the same time further in to contact with body seat b. In this instance, the valve disc 9 tends to shift in the downstream direction parallel to the passage owing to the clearances at bearings for valve stem 4, and flexion of valve stem 4, and this results in an imbalance of sealing effect between a tight contacting part T and a slack contacting part S of body seat b and disc seat a. Where the angle of inclination was 7 degrees, valve disc 9 did not contact body seat b uniformly and the amount of its rotation was small, as shown in FIG. 5D, resulting in a low pressure disc seat-body seat contact or clearance in a certain area of the valve disc periphery and thus a fluid leak. On the other hand, where the angle of inclination was 2 degrees, disc seat a and body seat b were in tight substantially face to face contact permitting no fluid leaks.

FIGS. 5E and 6E show a fifth step at which the test pressure is switched from 20 kg/cm² to zero with the valve in the closed position, whereupon body seat b contracts and surrounds valve disc 9 pressingly. Where the angle of inclination was 2 degrees, disc seat a and body seat b were in contact under great pressure in a manner to press against and wedge into each other, and it was impossible to open valve disc 9. Where the angle of inclination was 7 degrees, body seat b contacted only a small area of valve disc 9 and the latter could be opened easily. These results confirm that the larger the angle of inclination the smaller is the torque required for opening the valve while the smaller the angle of inclination the higher becomes the sealing quality.

The object of this invention is to provide a butterfly valve operable to open and close the valve disc with a small driving force while securing a good sealing quality.

BRIEF DESCRIPTION OF THE DRAWINGS

FIG. 1 is a vertical section of a butterfly valve,
FIG. 4 is an interrelation graph.

DESCRIPTION OF THE PREFERRED EMBODIMENT

Figure 2:
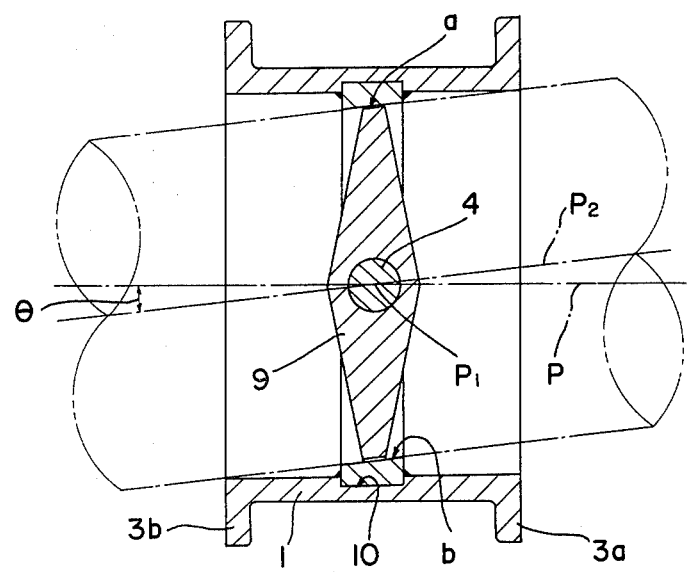
FIG. 2 is a section taken on line II—II of FIG. 1.
Figure 3:
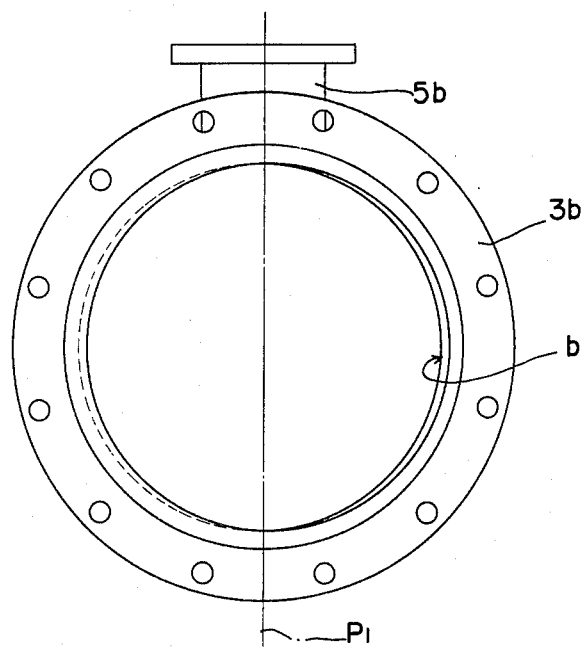
FIG. 3 is a valve body taken on line III—III of FIG. 1.
Figure 5A:
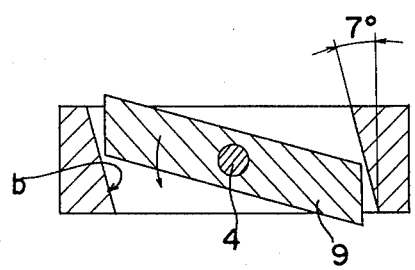
FIGS. 5A to 5E and FIGS. 6A to 6E are views illustrating test results.
Figure 6A:
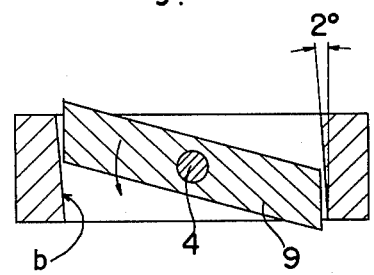
Figure 5B:
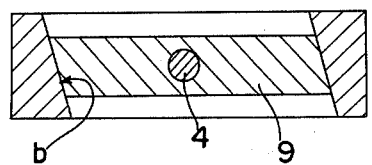
Figure 6B:
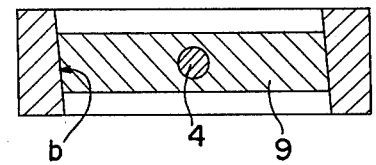
Figure 5C:
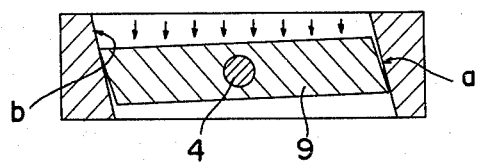
Figure 6C:
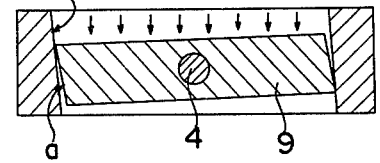
Figure 5D:
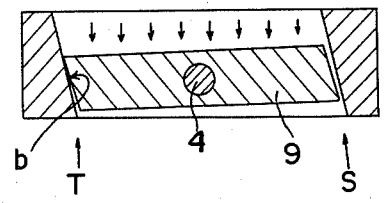
Figure 6D:
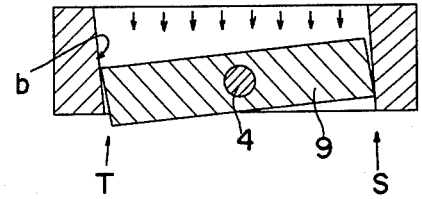
Figure 5E:
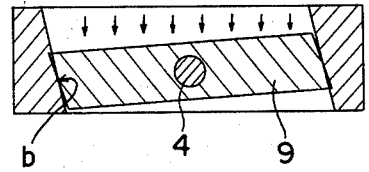
Figure 6E:
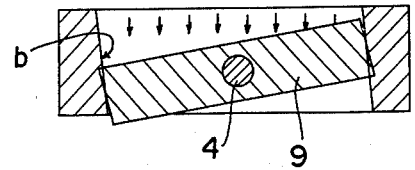

A mode of practising the invention will be described in detail with reference to the drawings.

A valve body 1 made of cast iron or steel such as cast steel, fabricated plate and forged steel and having a fluid passage is integrally provided with flanges 3a and 3b for coupling to fluid transmitting pipes 2 and with cylindrical parts 5a and 5b to receive a rotatable stem 4 having an axis P1 at right angles with center line P of the fluid passage. Stem 4 is rotatably supported by cylindrical parts 5a and 5b through bearings 6a and 6b. One end of the stem 4 protruding from one of the cylindrical parts 5a is provided with drive means 7 and the other end thereof rests in the other cylindrical part 5b which is closed with a cap 8.

Stem 4 securely carries a valve disc 9 provided peripherally with an annular metal disc seat a. The fluid passage is completely closed when valve disc 9 is perpendicular or about perpendicular to center line P of the fluid passage, and it is fully open when valve disc 9 is parallel or about parallel to center line P.

An annular groove 10 is defined on the inner surface of valve body 1 and an annular metal body seat b comprising divided parts is fitted in groove 10 and securely held therein by welding.

When the valve disc 9 is in the closed position, disc seat a and body seat b are adapted to contact one another over the entire circumference to maintain a sufficiently leak-tight condition. As shown in FIG. 2, disc seat a and body seat b are adapted to come into wedge contact in a manner that the sealing surfaces thereof correspond to the peripheral surface of an imaginary cylinder having a center line P2 inclined at an angle to center line P of the fluid passage in the direction of rotation to the closed position of the valve disc 9. Center line P of the fluid passage and center line P2 of the imaginary cylinder cross axis P1 of stem 4 at the center of valve disc 9.

The angle of inclination $\theta$ of the center line P2 of the imaginary cylinder (sealing surfaces of disc seat a and body seat b) with respect to center line P of the fluid passage is between 2 degrees 30 minutes to 6 degrees 30 minutes, and desirably in the neighbourhood of 5 degrees.

The material for hard annular disc seat a and body seat b includes plastics, hard rubber, and the like. Body seat b may be integral with valve body 1 or formed by weld beading. In case body seat b is not integral with valve body 1, its attaching manner is varied and, for example, body seat b may be secured to valve body 1 by bolts or the like, or welded direct to valve body 1.

What we claim is:

1. A butterfly valve comprising, a valve body having a fluid passage, a hard annular body seat in said valve body, a valve disc rotatable about an axis substantially perpendicular to a center line of said fluid passage, a hard annular disc seat of elliptical cross-sectional shape defined on the periphery of said valve disc, said disc seat adapted to contact said hard annular body seat on said valve body over the entire circumference thereof when said valve disc is in a position substantially perpendicular to said center line of said fluid passage, said body seat having a sealing surface of elliptical cross-sectional shape extending in a plane perpendicular to said center line of said fluid passage, said sealing surface corresponding to the peripheral surface of an imaginary cylinder having a center line inclined at an angle to said center line of said fluid passage in the direction of rotation to a closed position of said valve disc, said peripheral surface defining a cross-section in said imaginary cylinder of elliptical shape, the axis of said imaginary cylinder intersecting said center line of said fluid passage at the same point as the axis of rotation of said valve disc, said center line of said imaginary cylinder being inclined at an angle within the range of between 2 degrees 30 minutes to 6 degrees 30 minutes to the center line of said fluid passage.

* * * * *